Patented June 7, 1938

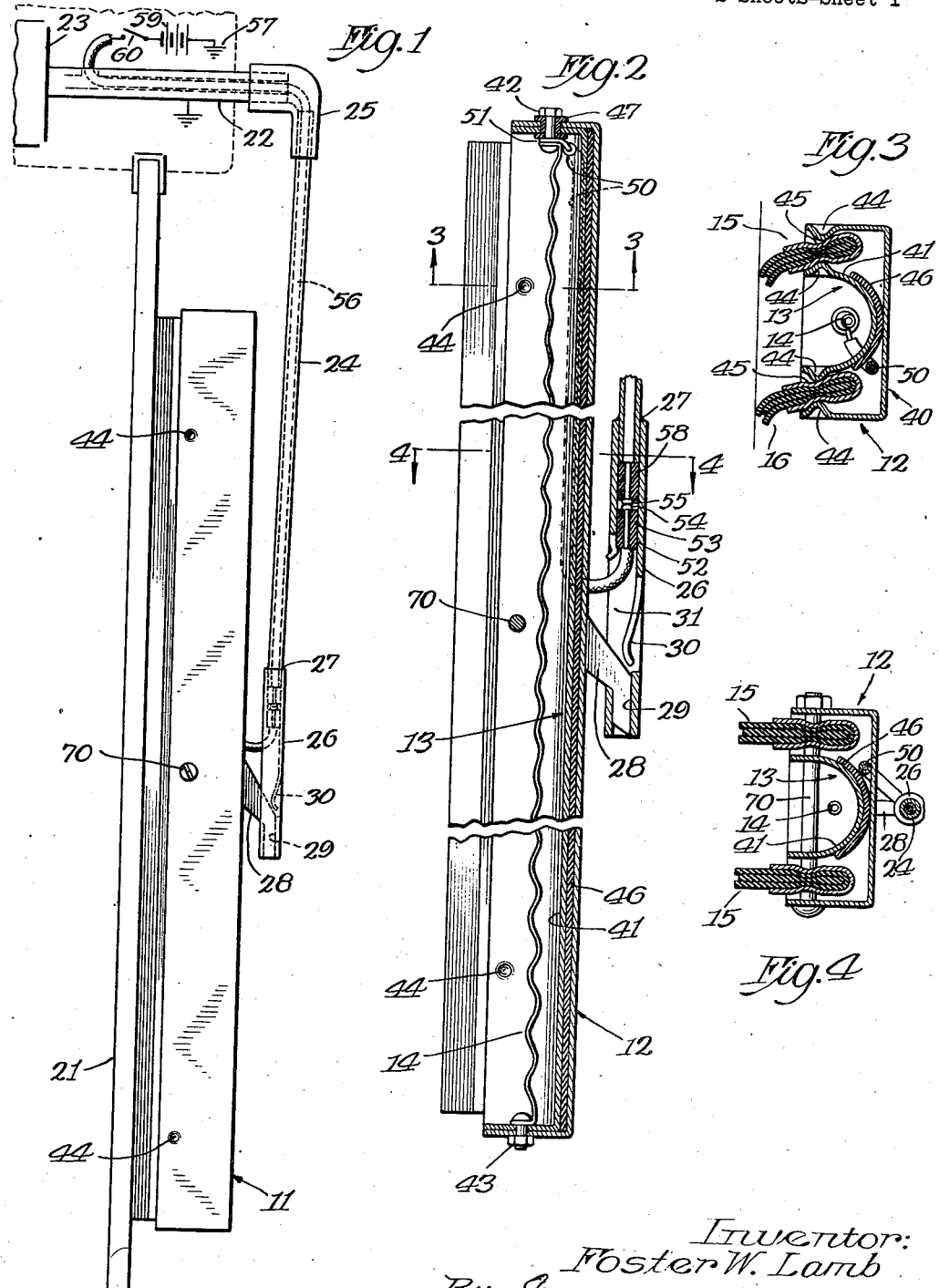

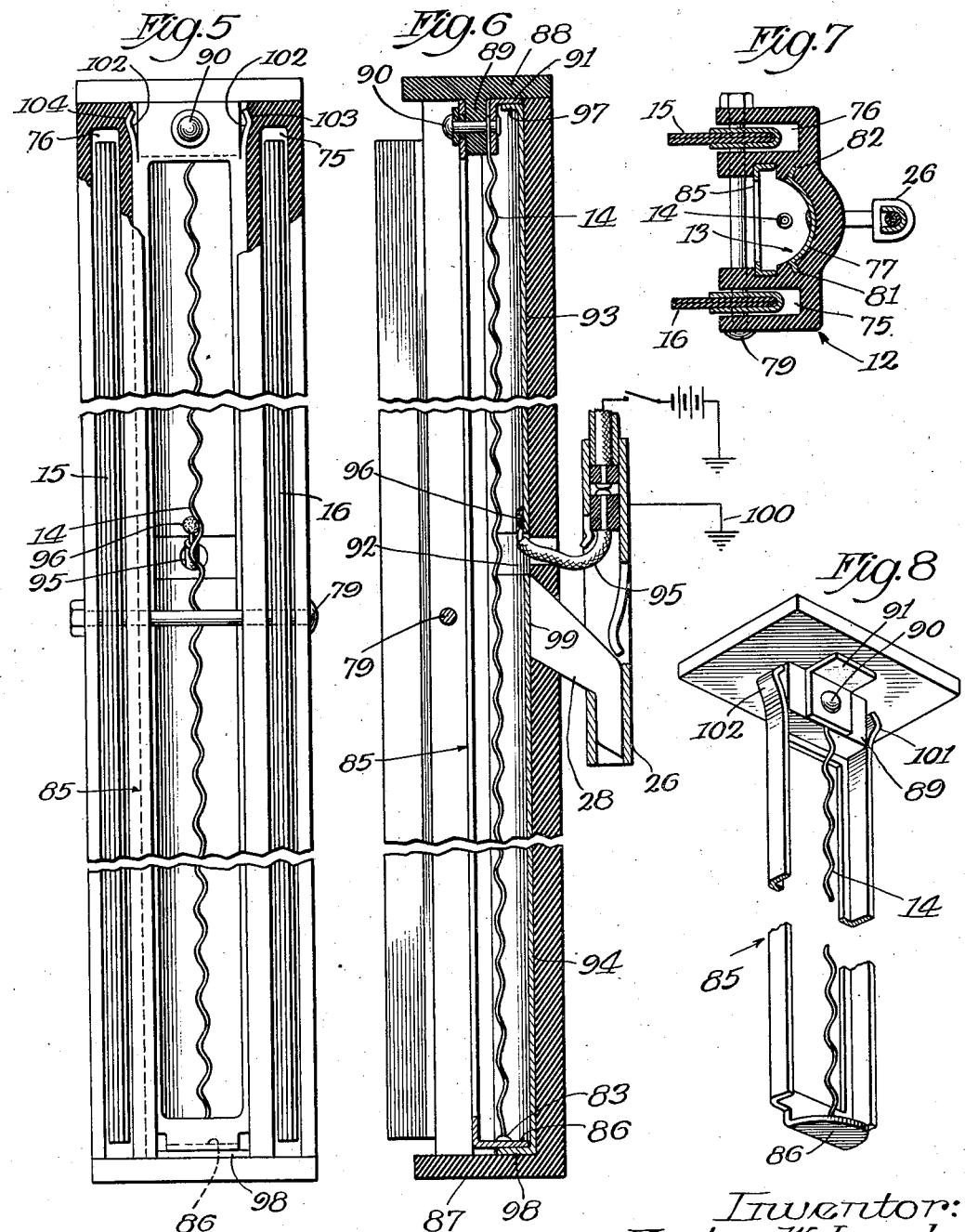

2,119,587

UNITED STATES PATENT OFFICE 2,119,587

HEATED VEHICLE WINDSHIELD WIPER

Foster W. Lamb, Tarentum, Pa.

Application July 7, 1936, Serial No. 89,324

5 Claims. (Cl. 219—19)

Modern speeds and traffic conditions have become so extreme that the automobile is rapidly becoming a menace to public safety. Attempts constantly are being made to increase automobile safety by developments in the materials and designs tending to increase the life and durability of the various parts and accessories employed in modern cars, and new safety devices are from time to time being offered as part of the standard equipment on new cars. But there is one weakness of considerable importance, which when overcome, would enhance safety in driving, and that is the visibility of the driver while operating in sleet and snow storms. Ice and snow collecting on the windshield produce a situation which is very troublesome to the driver and one which is extremely dangerous to the general public, resulting in numerous serious accidents.

The present invention is intended to overcome this weakness and has among its principal objects the following: To provide an efficient heated wiper which is adapted to employ conventional blades that are readily replaceable in the event of failure, and one in which the heating element may be quickly replaced at only a nominal cost; to provide a wiper that may be detached as a unit from the car and replaced by the conventional single blade when there is no further need for the heated wiper; and to provide an electrically heated wiper within which the wiring is completely enclosed.

Further and other objects and advantages will become apparent as the disclosure proceeds and the description is read in conjunction with the accompanying drawings, in which Fig. 1 is a side elevational view of a complete assembly showing the wiring from the motor casing to the adapter;

Fig. 2 is a longitudinal sectional view of the heated adapter, showing a method of attaching the adapter to the wiper arm, and showing the wiring from the adapter arm to the filament;

Fig. 3 is a transverse, sectional view of the adapter taken on the line 3—3 of Fig. 2;

Fig. 4 is a transverse sectional view of the adapter taken on the line 4—4 of Fig. 2;

Fig. 5 is a bottom plan view of a modified form of the adapter, partially cut away to show the method of securing in place the removable end piece;

Fig. 6 is a longitudinal, sectional view of the modified form shown in Fig. 5, showing an alternative method of completing the electrical circuit through the adapter;

Fig. 7 is a transverse, sectional view of the modified form shown in Fig. 6; and Fig. 8 is an isometric view of the heating unit employed in the modified form showing how this unit is secured to the removable end piece.

The invention consists broadly of a heated adapter 11 comprising a casing 12 being substantially channel-shape in cross section, as shown in Figs. 3, 4 and 7 and provided with a heat reflecting surface generally indicated at 13 and adapted to receive a filament 14 which extends longitudinally of the casing 12 and is secured substantially at the focal point of the reflecting surface 13; wiper means 15 and 16 are provided along the open side of the casing as shown in Figs. 3, 4 and 7. The adapter operates over a windshield indicated at 21 and receives an oscillating motion from a shaft 22 of a motor 23 through a wiper arm, 24, which carries the adapter. The arm 24 is secured to the shaft 22 by means of an elbow 25, and the adapter 11 is secured to the arm 24 by means of a sleeve 26 which is secured to the arm 24 by any suitable means such as by soldering, as shown at 27. The adapter 11 is provided with a boss 28 which is adapted to be received by the opening 29 in the sleeve 26, and is held in place by means of a spring clip 30. Provision is made for admitting the boss into the sleeve as shown at 31.

Figs. 2, 3 and 4 show a preferred form of the invention, which comprises a casing member 40 substantially U-shaped in cross section, which is adapted to receive a reflector 41 extending the full length of the casing member and is secured thereto by means of bolts 42 and 43 shown in Fig. 2. The inner faces of the casing and the outer faces of the reflector member are provided with a plurality of indentations 44 which engage recesses 45 provided along the sides of wiper blades 16, to permit a pivoting motion of the wiper blades about an axis running longitudinally thereof so as to give a dragging action to the wiper as it passes over the windshield. A strip of insulating material 46 is inserted between the reflecting element and the casing, as shown in Figs. 2 and 3, to prevent heat from being conducted away from the windshield glass 21. The heating filament 14 extends longitudinally of the reflecting member and is secured thereto by means of bolts 42 and 43 as shown in Fig. 2. Electrical insulation 47 is provided between the bolt 42 and the casing, but no such insulation is needed around the bolt 43 since the casing acts as part of the electrical circuit. The filament 14 is energized by means of a current passed through conductor 50 which is secured to the bolt 42 as indicated at 51.

One of the features of this invention is the removability of the adapter when the heated blade has no further use, as in the summer months when the conventional single blade wiper is adequate. To permit the adapter to be removed, the sleeve 26 is provided with a socket, shown at 52, which receives a plug 53 secured to the end of the conductor 50. This plug is made of an insulated material and the conductor 50 extends the entire length of the plug and projects from the end thereof to form an electrical contact shown at 54. This contact engages a corresponding contact 55 which is recessed at the end of the socket 52. The motor shaft 22 and the wiper arm 24 are hollow or U-shaped so as to receive a conductor 56 which is grounded to the car body, as indicated at 57, and extends to a plug 58 and terminates in the contact 55. A source of current 59 energizes the filament 14, and a switch 60 is located conveniently to the operator of the vehicle for the purpose of making or breaking the circuit to the heating element in the adapter.

The wiper means 15 and 16 are preferably of the conventional type blades and are secured to the heated adapter by means of a bolt 70 located substantially at the longitudinal center of the blades to permit pivoting of the blades about such bolt in a plane perpendicular to the glass 21 so as to cause the wiper blades to engage the glass uniformly along their entire length. Sufficient play is provided between the identations and the recesses 45 to permit this pivoting action to a limited degree.

In the alternative form of the heated adapter shown in Figs. 5, 6, 7 and 8, the casing 12 is molded from a non-electrically conducting material and is provided with slots 75 and 76 to receive the blades 15 and 16 which are held in place by means of a bolt 79. This bolt is positioned midway between the ends of the wiper blade so as to permit pivoting of the blade about the bolt in a plane perpendicular to the glass. Provision may be made as shown at 81 and 82 for inserting a reflector plate 77 along the top of a U-shaped opening 78 so as to more efficiently reflect the heat rays against the glass.

In this form of the invention, the adapter is provided with a heating element which may be removed as a unit and be replaced with a new filament at only a small cost. This unit comprises a metallic frame, generally indicated at 85, which includes an end piece 86 to which one end of the filament 14 is secured, as shown at 83. The casing member 12 is provided with end pieces 87 and 88, the latter of which is removable, and is provided with a boss 89 extending from its inner face to which the frame 85 is secured by means of a rivet 90. The loose end of the filament 14 is secured to the rivet 90 and engages an angle 91 which extends along the top surface of the boss 89, and then upwardly along the inner face of the removable end piece 88.

In this embodiment of the invention, the reflector plate 77 is cut transversely of the adapter, as shown at 92, forming two segments 93 and 94. A conductor 95 extends from the socket 52 and is secured to the reflector segment 93, as shown at 96. This reflector segment extends longitudinally of the adapter and terminates in a conductor 97 which is adapted to engage the vertical portion of the angle 91 when the removable end piece 88 is in place. The reflector segment 94 extends longitudinally of the adapter in the opposite direction and terminates in a conductor 98 which is adapted to engage the metallic end piece 86 of the frame 85. The boss 28, which supports the adapter on the wiper arm extends through the top of the casing and engages the reflector segment 94 at 99. The sleeve 26 is metallic and is grounded to the car body as indicated at 100.

The sides of the frame 85 are bent at 101 and 102 as shown in Figs. 5 and 8, providing spring clips which are adapted to fit into small recesses 103 and 104, respectively, in the end of the casing 12, as shown in Fig. 5, thus providing means for holding the heating element in place.

I claim as my invention:

1. A heated adapter for windshield wipers comprising a reflector element being substantially U-shaped in cross section, a pair of wipers extending longitudinally of the reflecter adjacent the sides of the mouth thereof, a filament extending longitudinally of the reflecter and substantially at the focal point thereof, said wipers being arranged to have pivotal motion about an axis running transversely of the reflecter and being further adapted to oscillate about an axis running substantially longitudinally of the wiper.

2. In a heated adapter for windshield wipers the combination of a reflecter element of substantially U-shaped cross section, and having end enclosures, one of said enclosures being removable, wiper means associated with the reflecter element, a heating unit adapted to be received by the reflecter element and comprising spaced electrical conductors insulated from each other and held in a fixed position relative to each other, and a heating filament extending between the conductors and secured thereto, one of said conductors being secured at all times to the removable end enclosure so as to make said enclosure a part of the heating unit, and means for causing the conductors to contact and close an electrical circuit when the heating unit is inserted in the reflecter element.

3. In a heated adapter for windshield wipers the combination of a reflecter element of substantially U-shaped cross section and having end enclosures, one of said enclosures being removable, wiper means associated with the reflecter element, and a heating unit comprising a pair of spaced electrical conductors held in fixed position relative to each other and a heating filament extending between the two conductors, said reflecter element being segmented transversely of the adapter, each segment being insulated from the other and adapted to engage one of the spaced conductors thereby constituting a part of an electrical circuit through the filament, said circuit being closed when the removable end enclosure is in place in the adapter.

4. A heated adapter for windshield wipers comprising a reflecter element being substantially U-shaped in cross section, a pair of wipers extending longitudinally of the reflecter adjacent the sides of the mouth thereof, a filament extending longitudinally of the reflecter, said wipers being arranged to have pivotal motion about an axis running transversely of the reflecter and being further adapted to oscillate about an axis running substantially longitudinally of the wiper.

5. In a heated adapter for windshield wipers the combination of a reflecter portion of substantially U-shaped cross section, and having end enclosures, at least part of one of said enclosures being removable, wiper means associated with the reflecter element, a heating unit adapted to be received by the reflecter element and comprising spaced electrical conductors insulated from each other and held in a fixed position relative to each other, and a heating filament extending between the conductors and secured thereto, one of said conductors being secured at all times to the removable portion of the end enclosure so as to make said portion a part of the heating unit, and means for causing the conductors to contact and close an electrical circuit when the heating unit is inserted in the reflecter element.

FOSTER W. LAMB.